United States Patent [19]
Melli

[11] 3,844,368
[45] Oct. 29, 1974

[54] HYDRAULIC DRIVE SYSTEM

[76] Inventor: Vincent Melli, 99 Amelia St., Toronto, Ontario, Canada

[22] Filed: Jan. 24, 1972

[21] Appl. No.: 219,989

[52] U.S. Cl.................. 180/66 R, 415/72, 415/215
[51] Int. Cl............................................... B60k 3/04
[58] Field of Search............. 180/66 R; 415/215, 72

[56] References Cited
UNITED STATES PATENTS

| | | | |
|---|---|---|---|
| 649,546 | 5/1900 | Porter | 415/215 |
| 1,099,161 | 6/1914 | Brown | 180/66 R |
| 1,189,042 | 6/1916 | Beijer | 180/66 R |
| 1,902,439 | 3/1933 | Foss | 415/72 |
| 2,547,578 | 4/1951 | Holmes | 180/66 R |
| 2,642,144 | 6/1953 | Brewer | 180/66 R X |

*Primary Examiner*—David Schonberg
*Assistant Examiner*—John A. Pekar

[57] ABSTRACT

The specification sets forth a hydraulic system for driving the road wheels of a vehicle, in which each driven wheel has associated therewith a fluid circuit including a gear pump for pressurizing hydraulic fluid, a reversible fluid turbine driven by fluid from the pump and connected to the wheel, and a reversing shutoff-control valve for controlling fluid flow to the turbine. In a preferred embodiment, each turbine is characterized by a pair of inner and outer low-speed stages defined by helical grooves on the inner and outer surfaces of a hollow frusto-conical rotor co-operating with respective adjacent surfaces of inner and outer stator portions, such stages being in series-connected fluid communication for starting and low-speed operation. A high-speed stage defined by external peripheral teeth on a further portion of the rotor co-operating with a surrounding fluid chamber within the outer stator portion is in parallel fluid communication with the low-speed stages for driving the turbine at normal operating speeds.

3 Claims, 6 Drawing Figures

HYDRAULIC DRIVE SYSTEM

This invention relates generally to hydraulically operated vehicles, and in particular to an improved hydraulic drive system for such vehicles.

The prior drive system most closely related to the present invention is disclosed in my prior Canadian Pat. No. 628,358, the present invention representing improvements over the subject matter disclosed therein.

It is an object of the invention to provide an improved hydraulic drive system for a wheeled vehicle in which each driven wheel is actuated by an independent fluid turbine.

Another object of the invention is the provision of such a hydraulic drive system in which each wheel is driven with substantially equal power.

A further object of the invention is the provision of such a hydraulic drive system characterised by a simpler and more reliable control means than has been known heretofore.

Yet a further object of the invention is the provision of such a hydraulic drive system which is readily adaptable to tractor-trailer vehicle operations.

Additional objects and advantages of the present invention will become apparent from the following description of a preferred constructional embodiment, given by way of example only, and taken in conjunction with the accompanying drawings.

IN THE DRAWINGS

Figure 1:
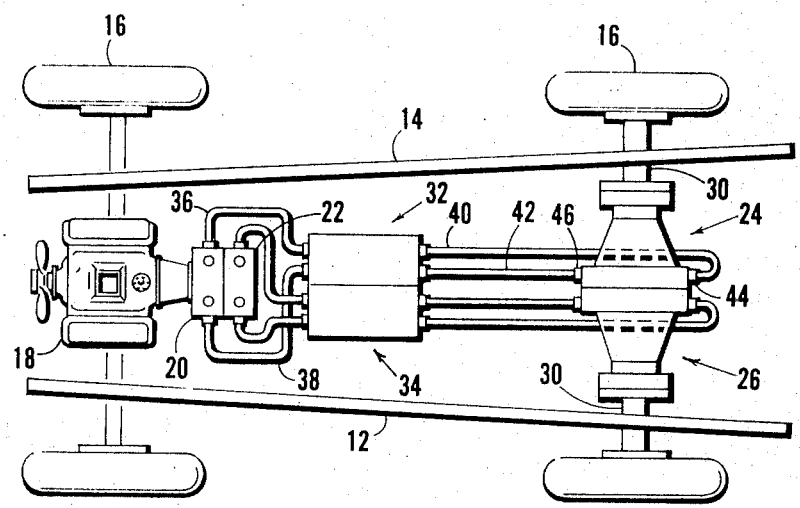
FIG. 1 is a schematic plan view of a vehicle embodying the present invention.

Referring now to the drawings, and initially to FIG. 1 thereof, there is illustrated schematically a four-wheeled vehicle driven by a hydraulic drive system according to the present invention and including a pair of elongated side frame members 12 and 14, a plurality of road wheels 16 connected to the frame members by any suitable suspension means, and an engine 18 mounted on the frame members in suitable fashion, not shown, and comprising for example a conventional internal combustion engine mounted at the forward end of the vehicle.

It is to be understood, of course, that the vehicle also includes in known manner steering and brake assembly systems; however, these form no part of the present invention and hence are not shown in the drawings or referred to herein except in general terms.

Each driven wheel of the vehicle, shown herein as the rear wheels 16 although it will later be shown that a four wheel drive is equally practicable, has associated therewith an individual operating fluid circuit comprising a respective fluid pressurizing means, preferably in the form of a rotary gear pump 20, 22; a reversible, hydraulically actuated fluid motor or turbine 24, 26 driven by pressurized fluid from the gear pump and mechanically coupled to its respective wheel axle 30 for driving same; a reversing control valve assembly 32, 34 for controlling the direction of fluid flow to and through the respective fluid motor; and fluid flow lines connecting the gear pump to the control valve and the control valve assembly to the fluid motor. Inasmuch as each fluid circuit as described above is identical, both as a whole and with respect to its individual components, the description will henceforth be restricted to a single one of such fluid circuits, i.e., that comprising gear pump 20, reversing control valve assembly 32 and fluid motor 24.

The gear pump 20 may comprise any suitable form for the purpose of providing hydraulic fluid under pressure to the remainder of the circuit; however, a preferred construction for such gear pump, as well as a preferred connection of same to the engine, is described in greater detail in my above-mentioned prior Canadian Pat. No. 628,358, such description being incorporated hereinto by reference. Generally, the gear pump of such prior application comprises a housing having a pair of meshing driven gears therein and inlet and outlet ports on opposite sides thereof, the gears being driven directly from the engine 18 by a suitable mechanical coupling. As a further feature, such pump also features a pair of bypass channels which divert fluid around the gears and are normally closed by respective pressure relief valves which are adapted to open at a predetermined pressure, whereby fluid will be bypassed around the gear pump in the event of blockage of a part of the fluid circuit to prevent damage to system components which would otherwise occur in the event of excessive system pressures.

The gear pump 20 will operate continuously to pump hydraulic fluid as long as the engine 18 is operating, due to the direct mechanical coupling therebetween; and hence of the two lines 36 and 38 connecting gear pump 20 to the control valve 32, one line will continuously act as a fluid supply line and the other will act as a fluid return line. From the outlet ports of the valve 32, a pair of fluid conduits 40 and 42 serve to convey the pressurized fluid to a pair of respective inlet ports 44 and 46 on the fluid motor 24 to effect operation thereof. Depending upon the setting of control valve 32, the hydraulic fluid can be selectively directed through lines 40 and 42 and fluid motor 24 in either direction to thereby effect reversible rotation of the latter, or fluid can be bypassed from supply line 36 directly into return line 38 to direct fluid from the motor and hence stop operation of the motor, as will be described in greater detail at a later point with reference to FIGS. 4 through 6.

Figure 2:
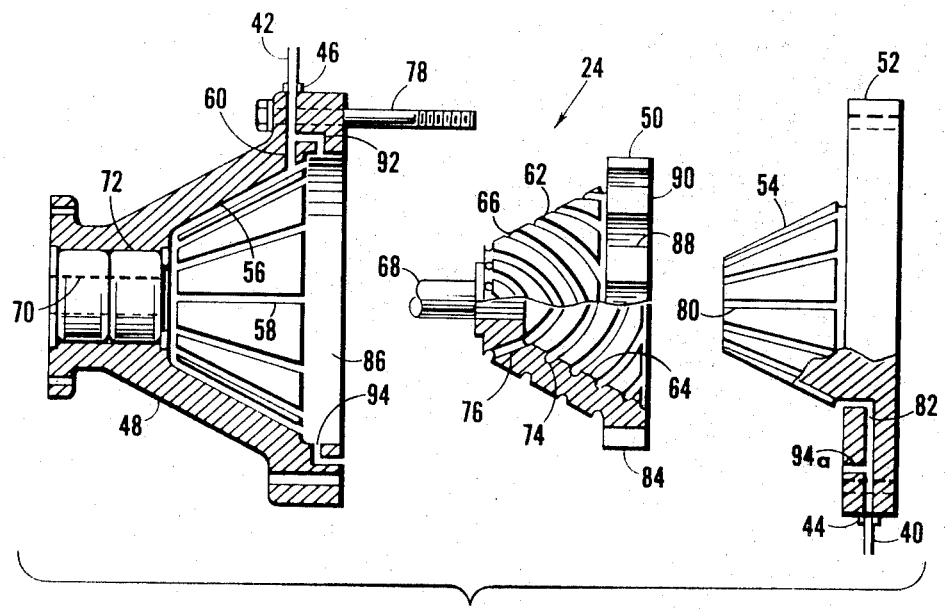
FIG. 2 is an exploded view, partially in section, of a wheel turbine of the invention showing the components thereof.
Figure 3:
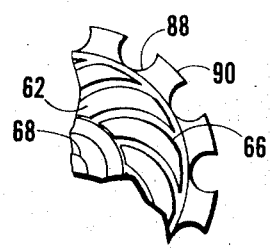
FIG. 3 is a fragmentary side view of the rotor member of FIG. 2.

Turning now to FIGS. 2 and 3, the components of the fluid motor or turbine 24 are shown in greater detail, and will be seen as comprising a hollow housing member 48 defining an outer stator portion of the turbine, a hollow rotor member 50 mounted for rotation within the housing 48, and a housing cover member 52 having an axially extending central portion 54 defining an inner stator portion of the turbine. Each of these members 48, 50 and 52, as illustrated, is preferably generally frusto-conical in configuration. Housing member 48 includes on its inner peripheral surface 56 a plurality of axially extending linear fluid-conducting grooves or channels 58 extending from the larger-diameter end thereof to the smaller-diameter end and communicating at the larger-diameter end by means of a radial bore 60 with one of the fluid conduits 42 at inlet port 46.

As illustrated, the rotor member 50 comprises a hollow, generally frusto-conical member having outer and inner conical surfaces 62 and 64, respectively. On the outer surface 62 are disposed a plurality of helical fluid conducting grooves or channels 66 extending from one axial end thereof to the other end, the rotor member 50 fitting in close, substantially fluid-tight relationship within the outer stator portion 48, whereby it will be appreciated that the axial grooves 58 and helical grooves 66 together form a first, generally annular fluid passageway or turbine stage between the inner surface 56 of the housing 48 and the outer surface 62 of the rotor member 50. Further, it will be seen that fluid entering through inlet port 46 and radial bore 60 will pass axially down the axial grooves 56, and by coacting with the helical grooves 66 on the rotor member will effect rotation of such rotor member. An output shaft 68 is secured to the rotor member for rotation therewith and extends outwardly from the housing 48 through an axial bore 70 therein, the output shaft 68 being coupled to the vehicle axle 30 and forming, if desired, an integral extension thereof. Suitable rotational bearing means 72 are provided for rotatably mounting the rotor member 50 within the housing, and suitable sealing means (not shown) are provided to prevent fluid leakage through the axial bore 70.

The rotor member 50 further includes on its inner peripheral surface 64 a second plurality of helically extending grooves or channels 74 communicating at the smaller-diameter or outer end of the rotor, through a series of generally radial fluid connecting bores 76, with the respective ends of the grooves 66 on the outer surface 62 thereof. The housing cover member 52 is adapted to be sealingly secured to the housing member 48, as by suitable bolts 78 and sealing means (not shown), and includes a central, generally frusto-conical portion 54 which, as mentioned above, defines an inner stator portion of the fluid motor or turbine. The inner stator portion 54 includes on its peripheral surface a plurality of axially extending linear grooves or passageways 80 which co-operate with and are in close, substantially fluid-tight relationship with the inner helical grooves 74 of the rotor member 50, thereby forming a second or inner, generally annular fluid passageway or turbine stage between the inner surface 64 of the rotor member 50 and the surface of the inner stator means 54. This inner turbine stage communicates at its larger-diameter end through a generally radial bore 82 to the other of the fluid conduits 40 at inlet port 44.

It should now be apparent that between the two inlet ports 44 and 46 there are defined a pair of inner and outer turbine stages connected in series-flow fluid communication, whereby fluid entering the turbine or fluid motor from either of the inlet ports must pass through both of the turbine stages before exiting from the other port. Specifically, assuming that the control valve assembly is set so as to introduce pressurized fluid through inlet port 46 and return the fluid to the valve and pump through the other port 44, the incoming fluid will pass through radial bore 60, through the first or outer turbine stage defined by grooves 58 and 66 to effect rotation of the rotor member, through the connecting passageways 76 and the inner or second turbine stage defined by grooves 74 and 80, and out through the radial bore 82 and fluid conduit 40. This two-stage arrangement of the turbine, particularly through the use of cooperating helical and axial grooves, permits an efficient self-starting of the turbine when the flow of fluid therethrough is initiated in the desired direction.

While the arrangement above has been found to exhibit excellent self-starting and low speed operating characteristics, it has also been found that the series fluid passageway or circuit through the two turbine stages creates a high resistance to fluid flow at operating speeds above a certain level, and hence operating efficiency drops off considerably at this point. Each wheel fluid motor or turbine 24 according to the invention, therefore, also includes a high speed stage which is for all intents inoperative when fluid flow is first initiated but which represents a low resistance path for fluid flow as the rotor member increases in rotational speed and which provides substantially all of the driving force at normal operating speeds, once the turbine has been started by the two stages described above.

Towards this end, the rotor member 50 includes a high-speed stage defined by a cylindrical or disk-like portion 84 which protrudes radially outwardly from the outer surface 62 and which is sealed against fluid communication from the grooves 66, such cylindrical portion 84 fitting closely within a circular or cylindrical fluid chamber 86 within the larger diameter end portion of the housing 48, such fluid chamber 86 likewise being sealed off from the grooves 58. The cylindrical portion 84 of the rotor member 50 includes a plurality of cut-out portions or recesses 88 around the periphery thereof, defining between such cut-out portions a plurality of circumferentially spaced, generally radially extending teeth 90. A first fluid passage 92 provides fluid communication between the radial bore 60, leading from inlet port 46, and the interior of chamber 86, while a second fluid passage 94 communicates a circumferentially spaced portion of the chamber 86, through a registering fluid passage 94a in the housing cover member 52, with radial bore 82 and the other inlet port 44. It will thus be seen that fluid passages 92, 94 and 94a provide inlet and outlet means for the high speed stage defined by the cylindrical portion 84 of rotor member 50 and by the fluid chamber 86, and that the high speed fluid circuit thus defined is, in effect, in parallel fluid communication with the two turbine stages previously described, inasmuch as an alternate path for fluid flow between the inlet ports 42 and 44 is provided thereby.

It will be understood that when fluid pressure is initially applied to the fluid motor or turbine 24, at least one and possibly both of the fluid passages 92, 94 will be blocked by respective teeth 90 of the high speed portion 84 of the rotor member 50, and hence there will be no fluid flow through this portion of the fluid circuit. However, fluid will flow through the two helical turbine stages described above, which may be considered as low speed or starting stages, thus initiating rotation of the rotor member 50 including its high speed portion 84. As the rotational speed of the rotor member increases, resistance to fluid flow through the two low speed stages will likewise rapidly increase, due to the limited fluid volume which can be accommodated by the grooves 58, 66, 74 and 80; however, at the same time, the resistance to fluid flow through the high speed stage decreases due to the nearly direct fluid path from inlet port 46 across passage 92, the fluid chamber 86, passages 94 and 94a and outlet port 44, with the result that a rapidly increasing proportion of the fluid flow is directed through the high speed stage, until at normal operating speeds substantially all of the fluid flow passes through the high speed stage and hence the turbine is at this point deriving substantially all of its power through this stage.

Figure 4:
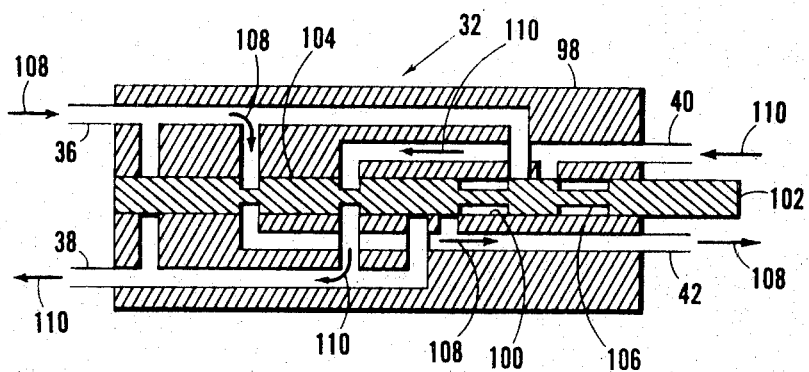
FIGS. 4, 5 and 6 are longitudinal sectional views of a control valve of the invention, respectively showing three operational positions thereof.
Figure 5:
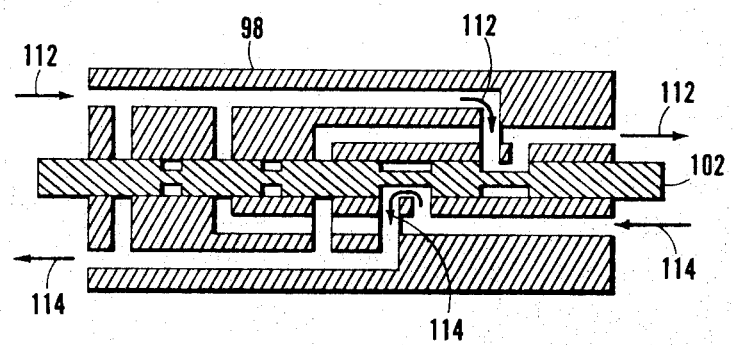
Figure 6:
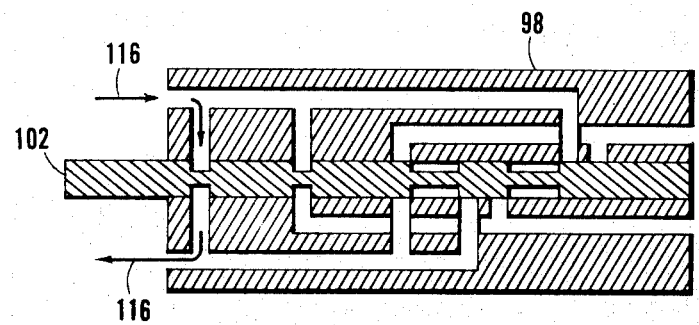

Referring next to FIGS. 4 through 6, the reversing control valve assembly 32 is shown in detail in one preferred embodiment thereof, and it will be seen that the assembly comprises a hollow valve body 98 having a generally central elongated bore 100 extending axially therethrough, the fluid inlet and return lines 36 and 38 communicating with the valve body at one end thereof while the fluid conduits 40 and 42 connecting to the fluid motor 24 are in communication with the opposite end of the valve body. An elongated valve member 102 extends axially through the bore 100 and is mounted for sliding axial movement therein to three positions respectively illustrated in FIGS. 4, 5 and 6, in which a series of axially spaced larger diameter portions 104 of the valve member 102, having suitable peripheral sealing means (not shown) to prevent fluid leakage therearound, are rigidly interconnected by a series of smaller diameter connector portions 106. It should be appreciated that the larger diameter portions 104 provide a fluid tight seal with the walls of the bore 100, while the smaller diameter portions 106 are sufficiently small to permit axial and/or radial fluid flow therearound.

As will be seen, the valve member 102 by its axial movement along the bore 100 within valve body 98, serves to selectively provide communication between the inlet and outlet lines 36 and 38 and the fluid conduits 40 and 42 by selectively aligning the smaller diameter portions 106 with certain radial passageways in the valve body 98. Thus in FIG. 4, considering fluid line 36 as a supply line and fluid line 38 as a return line, the valve is shown in its extreme right hand position (i.e., towards the rear of the vehicle) so that fluid flow from supply line 36 will pass in the direction of arrows 108 to fluid conduit line 42 and return flow will pass from conduit 40 in the direction of arrows 110 to the return line 38, to thereby effect rotation of the fluid motor 24 in a first direction, which may be considered the forward direction.

In FIG. 5, the valve member 102 is shown as shifted towards the left or front of the vehicle to a more central position relative to the valve body 98. In this position, fluid supply flow will be in the direction of arrows 112 to fluid conduit 40, while fluid return flow will be from conduit 42 in the direction of arrows 114 to return line 38, thus effecting rotation of the motor 24 in the opposite direction, which may be considered as reverse operation. Finally, in FIG. 6 the valve member 102 is shown as shifted to its extreme left hand or forward position, in which fluid is directly bypassed between the supply and return lines 36, 38 in the direction of arrows 116, so that no fluid will be directed through the fluid motor 24. This represents a neutral condition of the system, and may be used to disengage or stop the fluid motor 24 while the engine 18 remains running, without the necessity for providing a clutch or similar mechanical coupling and disengaging means.

Suitable detent or stop means may be provided, if desired, to ensure proper alignment of the smaller diameter portions 106 of the valve member 102 with the respective radial bores or passageways in the valve body 98 in each of the three positions noted above. Further means (not shown) are provided in suitable manner for effecting axial movement of the valve member 102 to a desired one of the three positions such as by a mechanical linkage from a manually operable handle or lever convenient to the driver of the vehicle. Under most conditions of operation it will be desired that the two or more wheels be driven in the same direction and at substantially the same speed and in this respect it may therefore be desirable to gang together the valve member 102 of valve assembly 32 with the valve member (not shown) of assembly 34 by suitable mechanical or electro-mechanical means, such as a mechanical connecting yoke, so that these will be actuated simultaneously to the same selected position.

The operation of the hydraulic system should now be apparent from the above description of its structure, but will be briefly reviewed hereunder. It is assumed that initially the system is in a state such that the engine 18 is operating, the vehicle is at rest, and the control valve assemblies 32 and 34 are in their neutral positions illustrated in FIG. 6. If the actuating means then is set to move each valve member 102 to its forward operating position illustrated in FIG. 4, hydraulic fluid under pressure will be fed through fluid conduit 42 and introduced into the respective fluid motor 24, 26 at inlet port 46, while return fluid will pass from port 44 through fluid conduit 40 to the valve and thence back to the gear pump.

As the pressurized fluid initially enters the fluid motor through inlet port 46 and radial bore 60, the fluid flow will tend to branch into two portions, one continuing into the outer or first turbine stage through grooves 58 and 66 and the other portion entering the high speed fluid chamber 86 through passage 92. However, while the rotor member 50 is stationary, fluid flow is prevented from passing across the chamber 86 due to the peripheral teeth 90 blocking one or both of the passages 92, 94 and hence the full force of the fluid flow will be directed through the first or outer turbine stage as noted above and thence through connecting passageways 76 into the second or inner turbine stage to thereby initiate rotation of the rotor member in the forward direction.

As the rotor member gains rotational speed, the high speed section becomes opened to fluid flow, since the teeth 90 will only occlude or block the passages 92 and 94 intermittently, and due to the comparatively direct fluid path therethrough this will represent a comparatively low resistance path for the fluid. At the same time, the parallel fluid path defined by the inner and outer helical turbine stages will present a rapidly increasing resistance to fluid flow therethrough due to the limited fluid capacity of the grooves 58, 66, 74 and 80 and as a result an increasing proportion of the fluid flow will travel across the high speed chamber 86, until at normal operating speeds substantially all of the fluid flow will be across the high speed stage.

While the wheel turbines or fluid motors 24, 26 may be constructed as individual units, to permit the use of independent rear suspension, where such independent suspension is not a major design consideration it is preferred that a pair of such fluid motors on a common axle be assembled in rigid back-to-back relationship, as illustrated, for simplicity in construction. In this form of construction, a single housing cover member 52 would be provided, having a pair of mirror-image inner stator sections 54 on opposite sides thereof to form a single common inner stator unit for the two fluid motors, such stator unit being bolted or otherwise secured between a pair of facing housing members corresponding to the single housing member 48 shown in FIG. 2.

It is further contemplated that the basic hydraulic drive system described above may be utilised in an articulated vehicle arrangement, particularly in a tractor-and-trailer type of vehicle, with a minimum of modification to the structure already described. In particular, the cab unit of such an articulated vehicle may have one or more axles driven by a system as described, while the trailer articulated therewith may have its rear axle or axles driven by a second such system to provide an additional propulsive force. In such an arrangement, the engine 18, pumps 20 and 22, and control valve assemblies 32 and 34 of the second such system would be mounted on or in the vehicle cab, with the fluid motors 24, 26 therefor mounted on the trailer and detachably coupled to the valve assemblies through a unitary four-line detachable hose coupling similar in principle and structure to couplings presently known for connecting the air brake lines of such an articulated vehicle. To compensate for fluid losses normally encountered during coupling and uncoupling operations, a fluid reservoir may be connected to the system on either the tractor or trailer side of the coupling and adapted to add fluid as necessary to maintain the system at a predetermined volume of fluid, as through an automatic pressure-responsive or fluid-level-responsive top-off valve.

As mentioned above, the gear pumps specifically disclosed in my prior patent include bypass channels diverting fluid around the pumps, such channels normally being closed by respective relief valves adapted to open at a predetermined, adjustable pressure. Such adjustability of the gear pumps finds particular advantage in the articulated or tractor-trailer arrangement described immediately above, in that the cab located pumps for the trailer wheels may be adjusted to bypass fluid at a considerably lower pressure than that in the system for the cab or tractor wheels, so that the trailer wheels will effectively be driven with less power than the cab wheels, e.g., with ten to twenty percent power as compared with the power applied to the tractor wheels. In this manner, a slight drag may be applied to the trailer relative to the tractor, to thereby significantly reduce the possibility of jack-knifing. Further, since the adjusting means for the gear pumps are preferably located convenient to the driver, the amount of relative power applied to the tractor and trailer may be readily varied during actual operating conditions, as required by particular road and/or load considerations encountered.

I claim as my invention:

1. A hydraulic drive system for a wheeled vehicle comprising fluid pressurizing means; drive means for said pressurizing means; fluid conduit means providing fluid communication between said pressurizing means and each of said fluid motors; control valve means disposed in said fluid conduit means and adapted to selectively reverse fluid flow to said fluid motors and to selectively bypass fluid flow from said fluid motors, said reversible fluid motors comprising a hollow stationary housing defining outer stator means and having a plurality of axially extending linear grooves on the inner surface thereof; a hollow rotor member mounted for rotation within said outer stator means and having a plurality of helical grooves on its outer surfaces defining with said linear grooves of said outer stator means a first generally annular fluid passageway means between said outer stator means and said rotor member, said rotor member further having a plurality of helical grooves on its inner surface; an output shaft secured to said rotor member and extending outwardly of said housing; a stationary mandrel positioned within said rotor member and defining inner stator means; said mandrel being rigidly secured to said housing and having a plurality of axially extending linear grooves on its outer surface defining with said helical grooves on the inner surface of said rotor member a second generally annular fluid passageway means between said rotor member and said inner stator means; fluid connector means providing fluid communication between respective first axial ends of said first and second fluid passageway means; and a pair of inlet ports in said housing respectively communicating the other axial ends of said first and second fluid passageway means with said valve means, whereby said first and second fluid passageway means are connected in series-flow relationship.

2. The system of claim 1 wherein said rotor member further comprises a circumferential high-speed portion including a plurality of circumferentially spaced, generally radially extending teeth on its outer surface, said housing including a generally circular fluid chamber enclosing a high-speed portion of said rotor member and including a pair of circumferentially spaced inlet means respectively communicating with said pair of inlet ports, whereby said circular fluid chamber and said pair of inlet means are in parallel fluid communication with said first and second fluid passageway means.

3. The system of claim 2 wherein said inner stator means, said outer stator means and said rotor member are each generally frusto-conical in configuration, said inlet ports of said housing being disposed at the larger-diameter end thereof, said fluid connector means comprising a plurality of generally radial bores through said rotor member at the smaller-diameter end thereof and providing fluid communication between the inner and outer surfaces thereof.

\* \* \* \* \*